US008537422B2

(12) United States Patent
Hakamada et al.

(10) Patent No.: US 8,537,422 B2
(45) Date of Patent: Sep. 17, 2013

(54) IMAGE DATA GENERATION METHOD AND DEVICE, AND STENCIL PRINTING APPARATUS, WITH DENSITY CONVERSION BASED ON PRESSING PRESSURE BASED ON RECORDING MEDIUM WIDTH OR THICKNESS

(75) Inventors: Junichi Hakamada, Ibaraki-ken (JP); Yoshiyuki Okada, Ibaraki-ken (JP); Masahiro Kawashima, Ibaraki-ken (JP)

(73) Assignee: Riso Kagaku Corporation (JP)

( * ) Notice: Subject to any disclaimer, the term of this patent is extended or adjusted under 35 U.S.C. 154(b) by 615 days.

(21) Appl. No.: 12/856,064

(22) Filed: Aug. 13, 2010

(65) Prior Publication Data

US 2011/0036251 A1 Feb. 17, 2011

(30) Foreign Application Priority Data

Aug. 17, 2009 (JP) ................................ 2009-188526

(51) Int. Cl.
*H04N 1/407* (2006.01)
*B41M 1/12* (2006.01)

(52) U.S. Cl.
USPC ......... 358/3.01; 358/3.21; 358/406; 358/461; 358/296; 101/114

(58) Field of Classification Search
USPC ............... 358/1.9, 3.01, 3.21, 3.24, 504, 521, 358/406, 448, 461, 296; 399/318, 328, 331, 399/339; 101/48–51, 112, 114, 121, 125, 101/126, 127
See application file for complete search history.

(56) References Cited

U.S. PATENT DOCUMENTS

| | | | | |
|---|---|---|---|---|
| 5,517,913 | A * | 5/1996 | Oshio et al. | 101/119 |
| 6,883,424 | B2 * | 4/2005 | Watanabe et al. | 101/118 |
| 7,269,367 | B2 * | 9/2007 | Kwon et al. | 399/45 |
| 8,422,037 | B2 * | 4/2013 | Hodoshima et al. | 358/1.1 |
| 2012/0192734 | A1 * | 8/2012 | Ono | 101/115 |

FOREIGN PATENT DOCUMENTS

| | | | |
|---|---|---|---|
| JP | 02040681 | A * | 2/1990 |
| JP | 2006-315288 | A | 11/2006 |

* cited by examiner

*Primary Examiner* — Scott A Rogers
(74) *Attorney, Agent, or Firm* — Studebaker & Brackett PC

(57) ABSTRACT

An input of image data is received, and information of width and/or thickness of a recording medium, which receives an image representing the image data to be recorded thereon, is received. Then, a preset pressing pressure value, which is used when the image is recorded on the recording medium, is obtained based on the information of width and/or thickness, and information of image density in the reference area, which is a part of the image data, is obtained. Then, converted image density information is obtained by converting the information of image density in the reference area based on the pressing pressure value and the information of image density, and image data is generated according to the thus obtained converted image density information.

8 Claims, 8 Drawing Sheets

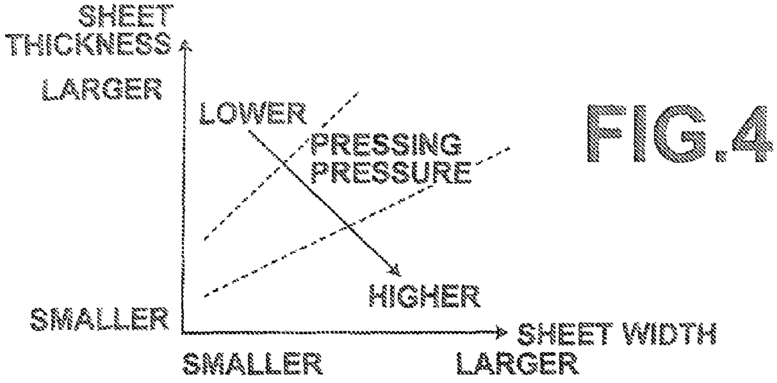
FIG.4
FIG.5
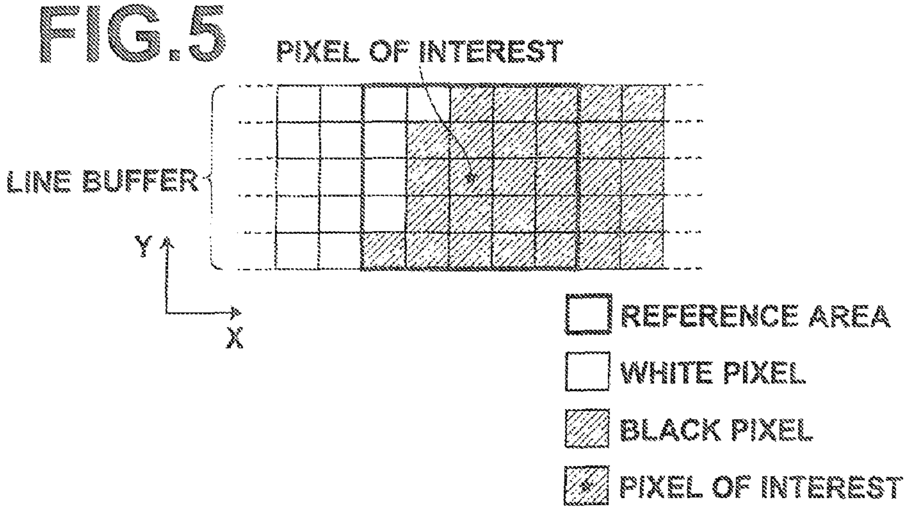
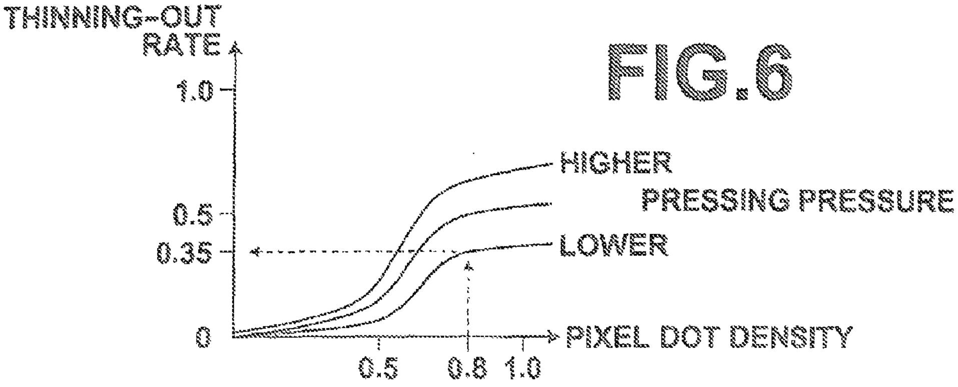
FIG.6

THRESHOLD MATRIX T(4.4)

| | | | |
|---|---|---|---|
| 0.06 | 0.56 | 0.18 | 0.68 |
| 0.81 | 0.31 | 0.93 | 0.43 |
| 0.25 | 0.75 | 0.12 | 0.62 |
| 0.99 | 0.50 | 0.87 | 0.37 |

IMAGE DATA GENERATION METHOD AND DEVICE, AND STENCIL PRINTING APPARATUS, WITH DENSITY CONVERSION BASED ON PRESSING PRESSURE BASED ON RECORDING MEDIUM WIDTH OR THICKNESS

BACKGROUND OF THE INVENTION

1. Field of the Invention

The present invention relates to a method and device for generating image data, which involve receiving input of image data and applying image density conversion processing to the image data, as well as a stencil printing apparatus.

2. Description of the Related Art

Various stencil printing apparatuses have been proposed. In stencil printing, a master sheet is produced through plate making processing using a thermal head, or the like, which is driven to melt and perforate a stencil master sheet according to image data obtained by reading an original document with a scanner, or the like. Then, the thus produced master sheet is wrapped around a printer drum and an ink is fed from the interior of the printer drum. The ink is transferred onto a printing sheet using a roller, or the like, to achieve printing.

Among the stencil printing apparatuses as described above, stencil printing apparatuses that perform double-face printing and that perform two-color printing, for example, have been proposed.

With the stencil printing apparatuses as described above, problem of contamination of prints may occur due to so-called "strike through", "set-off", retransfer of ink, etc., when the ink is excessively transferred onto the printing sheet, for example. In particular, with a stencil printing apparatus for double-face printing, for example, which includes a printer drum used for printing with a first master sheet and a printer drum used for printing with a second master sheet, the printing with the second master sheet is carried out before the ink from the first master sheet has sufficiently been dried. Therefore, the ink on the printing sheet tends to be transferred onto conveyance rollers and pressing rollers disposed along the sheet feeding path, and be further transferred from the rollers to another printing sheet.

In order to solve this problem, a method has been proposed, which involves reducing the pressing pressure to reduce the amount of ink transfer, thereby minimizing the retransfer of ink.

Further, Japanese Unexamined Patent Publication No. 2006-315288 (which is hereinafter referred to as "Patent Document 1") has proposed a method for achieving an optimal amount of ink transfer by controlling plate making conditions, such as plate making energy and dot density, according to an image feature quantity of each of small areas of an image to be formed on the stencil master sheet through plate making.

However, with the above-described method that involves reducing the pressing pressure, although the amount of ink transfer can be reduced, density stability is impaired and the image quality is degraded if the pressing pressure is excessively low.

Further, even when the amount of ink transfer is controlled in the manner as in the method disclosed in Patent Document 1, the printing pressure applied from the pressing roller to the printer drum varies when printing sheets having different thicknesses and widths are used, and thus an optimal amount of ink transfer may not necessarily be achieved.

For example, when an A3-size printing sheet is used, a relatively large contact area is provided between the pressing roller and the printing sheet, and thus a uniform printing pressure is applied to the printing sheet. On the other hand, when an A4-size printing sheet is used, a smaller contact area is provided between the pressing roller and the printing sheet, and thus a higher printing pressure is applied to the printing sheet. Further, since the distance between the printer drum and the pressing roller is fixed, a higher printing pressure is applied to a thicker printing sheet, and a lower printing pressure is applied to a thinner printing sheet.

Therefore, when conditions of the printing sheets vary, it is impossible to achieve an optimal amount of ink transfer, and this may result in prints with insufficient density or prints with contamination due to the ink retransfer.

SUMMARY OF THE INVENTION

In view of the above-described circumstances, the present invention is directed to providing a method and device for generating image data, as well as a stencil printing apparatus, with which an optimal amount of ink transfer onto a printing sheet is achieved regardless of the width and thickness of the printing sheet and local features of the original image, thereby minimizing such image degradation as insufficient density of prints due to insufficient printing pressure and contamination of prints due to strike-through, set-off or retransfer of ink.

An aspect of the method for generating image data of the invention includes the steps of: receiving an input of image data, and receiving information of width and/or thickness of a recording medium, the recording medium receiving an image representing the image data to be recorded thereon; obtaining a preset pressing pressure value based on the information of width and/or thickness, the preset pressing pressure value being used when the image is recorded on the recording medium; obtaining information of image density in a reference area, the reference area being a part of the image data; obtaining converted image density information by converting the information of image density in the reference area based on the pressing pressure value and the information of image density; and generating image data according to the obtained converted image density information.

The description "obtaining information of image density in a reference area, the reference area being a part of the image data; obtaining converted image density information by converting the information of image density in the reference area based on the pressing pressure value and the information of image density" herein refers to obtaining information of image density in a given reference area, which is a partial area of the image data, and obtaining converted image density information by converting the information of image density in the reference area, which is the same as the given reference area, based on the information of image density and the information of the pressing pressure.

An aspect of the device for generating image data of the invention includes: an image data receiving unit for receiving an input of image data; a recording medium information receiving unit for receiving information of width and/or thickness of a recording medium, the recording medium receiving an image to be recorded thereon, the image representing the image data received by the image data receiving unit; a pressing pressure obtaining unit for obtaining a preset pressing pressure value based on the information of width and/or thickness received by the recording medium information receiving unit, the preset pressing pressure value being used when the image is recorded on the recording medium; an image density information obtaining unit for obtaining information of image density in a reference area, the reference area being a part of the image data; an image density information conversion unit for obtaining converted image density information by converting the information of image density in the reference area based on the pressing pressure value and the information of image density; and an image data obtaining unit for generating processed image data according to the converted image density information obtained by the image density information conversion unit.

In the device for generating image data of the invention, the image density information obtaining unit may obtain information of pixel dot density in the reference area as the information of image density in the reference area.

Further, the image density information conversion unit may obtain, as the converted image density information, a thinning-out rate for the reference area by converting the information of image density in the reference area, and the image data obtaining unit may generate the processed image data by applying thinning-out processing to the image data based on the thinning-out rate obtained by the image density information conversion unit.

Further, the image density information conversion unit may include preset image density conversion curves for different pressing pressures, and may convert the information of image density by selecting one of the image density conversion curves according to the pressing pressure inputted thereto.

Further, the image density conversion curve may provide a lower image density information value for a higher value of the information of image density in the reference area, and a ratio of decrease of a value of the converted image density information relative to increase of the value of the information of image density in the reference area may gradually increase along with increase of the value of the information of image density in the reference area, and then, the ratio of decrease may gradually decrease.

The device for generating image data of the invention may further include: a picture area determining unit for determining whether or not image data in the reference area is image data representing a photographic picture; and a binarization processing unit for applying binarization processing to the image data, wherein if it is determined by the picture area determining unit that the image data in the reference area is image data representing a photographic picture, the image density information obtaining unit obtains, as the information of image density in the reference area, an average image density in the reference area based on the image data in the reference area before subjected to the binarization processing, the image density information conversion unit obtains an output image density for the image data in the reference area based on the average image density in the reference area, and the image data obtaining unit generates the processed image data by applying image density conversion processing to the image data based on the output image density obtained by the image density information conversion unit, or wherein if it is determined by the picture area determining unit that the image data in the reference area is not image data representing a photographic picture, the image density information obtaining unit obtains, as the information of image density in the reference area, a pixel dot density in the reference area based on the binary image data in the reference area subjected to the binarization processing by the binarization processing unit, the image density information conversion unit obtains a thinning-out rate for the image data in the reference area based on the pixel dot density in the reference area, and the image data obtaining unit generates the processed image data by applying thinning-out processing to the image data based on the thinning-out rate obtained by the image density information conversion unit.

An aspect of the stencil printing apparatus of the invention includes: the device for generating image data of the invention; a plate making unit for carrying out plate making processing based on the processed image data generated by the image data generation device; and a printing unit including a drum, a master sheet processed at the plate making unit being wrapped around on the drum, and a pressing roller for pressing the recording medium against the drum with a pressing pressure corresponding to the pressing pressure value used in the device for generating image data.

According to the method and device for generating image data as well as the stencil printing apparatus of the invention, a preset pressing pressure value, which is used when the image is recorded on the recording medium, is obtained based on the information of width and/or thickness of the recording medium, and information of image density in a reference area, which is apart of the image data, is obtained. Then, converted image density information is obtained by converting the information of image density in the reference area based on the pressing pressure value and the information of image density, and image data is generated according to the thus obtained converted image density information. Therefore, an optimal amount of ink transfer onto a printing sheet is achieved regardless of the width and thickness of the printing sheet and local features of the original image, thereby minimizing such image degradation as insufficient density of prints due to insufficient printing pressure and contamination of prints due to strike-through, set-off or retransfer of ink.

Further, in the case where preset image density conversion curves for different pressing pressures are provided, and the information of image density is converted using one of the image density conversion curves which is selected according to the inputted pressing pressure value, the amount of ink transfer can be controlled depending on an environmental change or to the taste of the user.

Further, in the case where determination is made as to whether or not image data in the reference area is image data representing a photographic picture and the method used to convert the information of image density is changed according to the result of the determination, the image density conversion processing is applied to the multivalued image data at an area where tone is important, and thus degradation of image quality due to interference between the pattern of the binary image and the pattern of the thinning-out, which is caused by applying the thinning-out processing to the binary image data, can be avoided. On the other hand, at an area where resolution is important, the thinning-out processing is applied to the binary image data, thereby avoiding blurring of fine or small character or line, which is the case when the image density conversion processing is applied to the multivalued image data.

BRIEF DESCRIPTION OF THE DRAWINGS

FIG. 4 is a diagram illustrating a relationship between width and thickness of a printing sheet and a pressing pressure, FIG. 5 is a diagram illustrating one example of image data, a reference area and a pixel of interest, FIG. 6 is a diagram illustrating one example of image density conversion curves for different pressing pressures.

DESCRIPTION OF THE PREFERRED EMBODIMENTS

Figure 1:
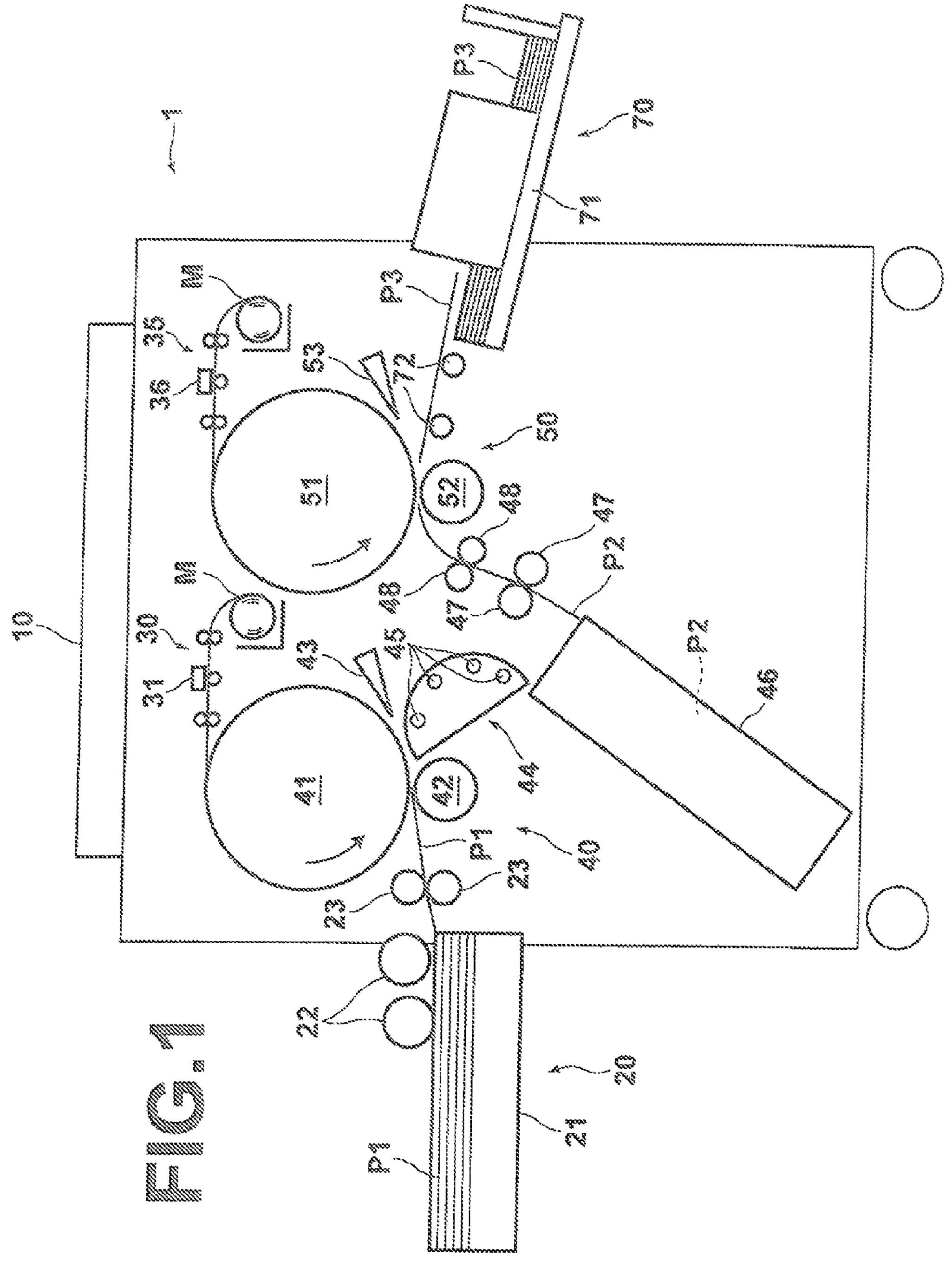
FIG. 1 is a diagram illustrating the schematic entire structure of a first embodiment of a stencil printing apparatus according to the present invention.

Hereinafter, a first embodiment of a stencil printing apparatus employing an image data generation device of the present invention will be described in detail with reference to the drawings. The stencil printing apparatus of this embodiment is characterized by a method for generating image data. First, the schematic structure of the stencil printing apparatus is described. FIG. 1 is a diagram illustrating the schematic entire structure of the stencil printing apparatus of this embodiment.

As shown in FIG. 1, the stencil printing apparatus 1 of this embodiment includes: an image reading unit 10, which reads an image of an original document and outputs image data; first and second plate making units 30 and 35, which apply plate making processing to a stencil master sheet M based on the image data read by the image reading unit 10; first and second printing units 40 and 50, which carry out printing on a printing sheet P1 using the stencil master sheets M subjected to plate making at the first and second plate making units 30 and 35; a paper feeding unit 20, which feeds the printing sheet P1 to the first printing unit 40; an intermediate stocking unit 46, which temporarily stocks a printing sheet P2 with a first side thereof printed by the first printing unit 40 (and thus being single-face printed), and then feeds the printing sheet P2 to the second printing unit 50 at predetermined timing; and a sheet discharging unit 70, which discharges a printing sheet P3 with a second side thereof printed by the second printing unit 50 (and thus being double-face printed).

The image reading unit 10 includes a line image sensor, which photoelectrically reads image information of the original document. The image reading unit 10 reads the original document by scanning the original document with the line image sensor, and outputs the image data.

The first plate making unit 30 includes a thermal head 31, which includes a line of heating elements. The first plate making unit 30 applies the plate making processing using the thermal head 31 to the stencil master sheet M, which is fed from a stencil master sheet roll. It should be noted that the first plate making unit 30 applies the plate making processing based on processed image data outputted from an image data generating unit 60, which will be described later.

Similarly to the first plate making unit 30, the second plate making unit 35 includes a thermal head 36. The second plate making unit 35 applies the plate making processing using the thermal head 36 to the stencil master sheet M, which is fed from a stencil master sheet roll. The second plate making unit 35 also applies the plate making processing based on processed image data outputted from the image data generating unit 60, which will be described later. However, since contamination due to the ink retransfer does not occur at the second printing unit 50, the image data used at the second plate making unit 35 may not be subjected to thinning-out processing at the image data generating unit 60.

The first printing unit 40 includes: a cylindrical first printer drum 41, which allows passing of ink therethrough and formed, for example, by a porous metal plate or a mesh structure; a first pressing roller 42, which presses the printing sheet P1 against the first printer drum 41 with a predetermined pressing pressure; and a first peeling nail 43, which peels off the single-face printed printing sheet P2 from the first printer drum 41. The stencil master sheet M, which has been subjected to plate making, i.e., perforated at the first plate making unit 30, is wrapped around the outer circumference of the first printer drum 41. The first pressing roller 42 extends along a direction in which the central axis of the cylinder of the first printer drum 41 extends (the direction perpendicular to the plane of FIG. 1).

Similarly to the first printing unit 40, the second printing unit 50 includes: a cylindrical second printer drum 51; a second pressing roller 52, which presses the printing sheet P2 against the second printer drum 51 with a predetermined pressing pressure; and a second peeling nail 53, which peels off the double-face printed printing sheet P3 from the second printer drum 51. The stencil master sheet M, which has been subjected to plate making, i.e., perforated at the second plate making unit 35, is wrapped around the outer circumference of the second printer drum 51. The second pressing roller 52 extends along a direction in which the central axis of the cylinder of the second printer drum 51 extends (the direction perpendicular to the plane of FIG. 1).

The paper feeding unit 20 includes: a feed tray 21, on which the printing sheets P1 are placed; primary feed rollers 22, which feed the printing sheet P1 one by one from the feed tray 21 to the secondary feed roller 23; and secondary feed rollers 23, which are disposed downstream in the conveyance direction from the primary feed rollers 22, and which temporarily stop the leading edge of the printing sheet P1 conveyed by the primary feed rollers 22, and then feed the printing sheet P1 between the first printer drum 41 and the first pressing roller 42 at predetermined timing.

The sheet discharging unit 70 includes: a discharging belt unit 72, which conveys the double-face printed printing sheet P3 to a discharge tray 71; and the discharge tray 71, on which the double-face printed printing sheets P3 conveyed by the discharging belt unit 72 are stacked.

Further, a curved conveyance unit 44 is disposed between the first printing unit 40 and the intermediate stocking unit 46. As shown in FIG. 1, the curved conveyance unit 44 includes a guide plate, which has a curved surface along the conveyance path. A conveyance belt provided with suction ports for holding the printing sheet P1 fed from the first printing unit 40 with a suction force is disposed on the curved surface of the guide plate. Further, pulleys 45 for moving the conveyance belt in a circulating manner are provided. The curved conveyance unit 44 holds the single-face printed printing sheet P2 with a suction force applied from the suction ports in the conveyance belt, and conveys the single-face printed printing sheet P2 held on the conveyance belt along the curved surface of the guide plate by rotating the pulleys 45.

Further, pickup rollers 47, which pick up the single-face printed printing sheet P2 conveyed from the intermediate stocking unit 46, and timing rollers 48, which sequentially send the single-face printed printing sheet P2 picked up by the pickup rollers 47 between the second printer drum 51 and the second pressing roller 52 at predetermined timing, are disposed between the intermediate stocking unit 46 and the second printing unit 50.

The stencil printing apparatus 1 of this embodiment further includes the image data generating unit 60, which applies predetermined image density conversion processing to the image data outputted from the image reading unit 10, and outputs the converted image data to the first and second plate making units 30 and 35.

Figure 2:
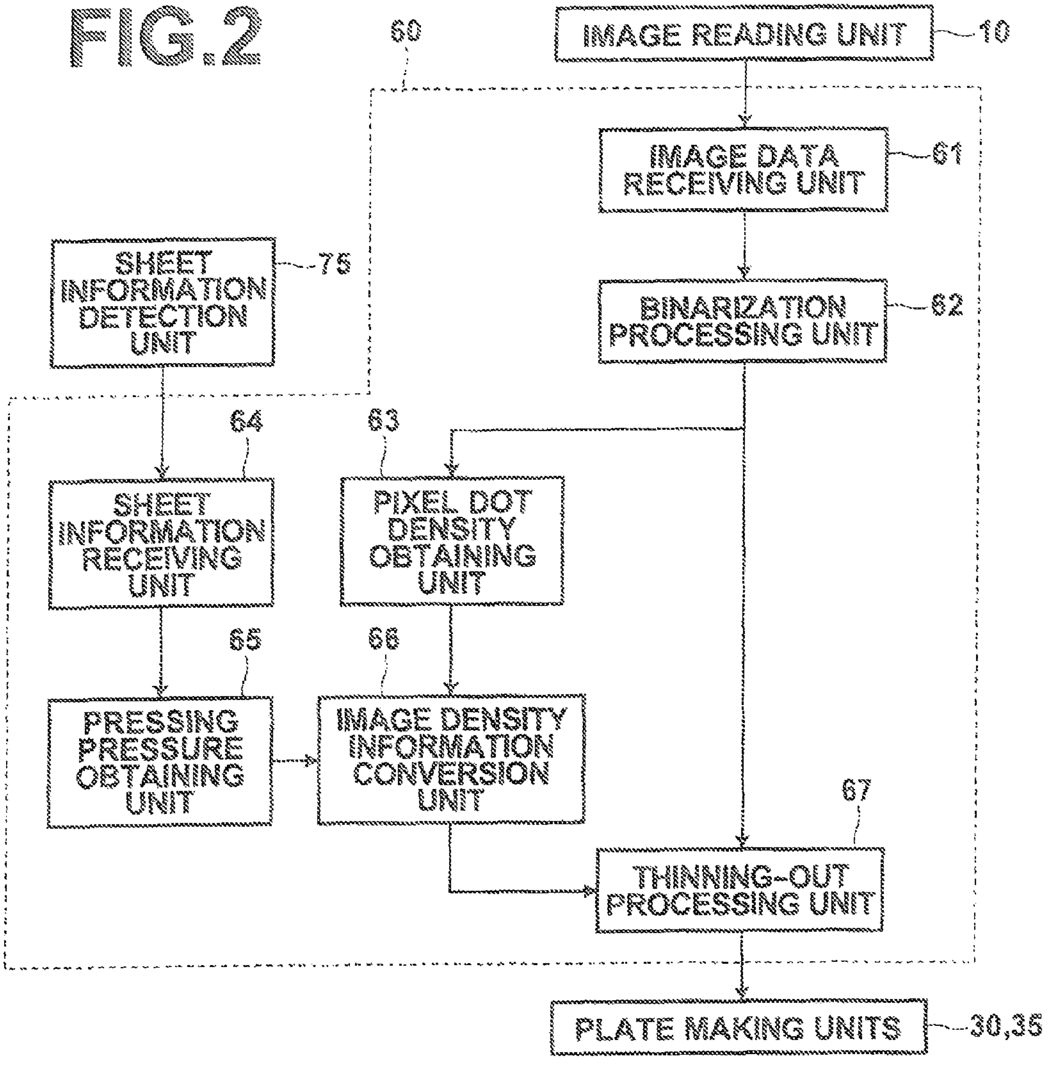
FIG. 2 is a block diagram illustrating the configuration of an image data generating unit according to the first embodiment of the stencil printing apparatus of the invention.

Specifically, as shown in FIG. 2, the image data generating unit 60 includes: an image data receiving unit 61, which receives an input of the image data outputted from the image reading unit 10; a binarization processing unit 62, which applies binarization processing to the image data received by the image data receiving unit 61; a pixel dot density obtaining unit 63, which obtains a pixel dot density value in a reference area, which is a part of the binary image data subjected to the binarization processing by the binarization processing unit 62; a sheet information receiving unit 64, which receives information of the width and thickness of the printing sheet P1; a pressing pressure obtaining unit 65, which obtains a preset pressing pressure value of the first and second pressing rollers 42 and 52 based on the information of the width and thickness of the printing sheet P1 received by the sheet information receiving unit 64; an image density information conversion unit 66, which obtains a thinning-out rate for the binary image data in the reference area based on the pressing pressure value obtained by the pressing pressure obtaining unit 65 and the pixel dot density value obtained by the pixel dot density obtaining unit 63; and a thinning-out processing unit 67, which applies thinning-out processing to the binary image data in the reference area based on the thinning-out rate obtained by the image density information conversion unit 66 and generates the processed image data. Operations of the above-described units will be described in detail later.

Although not shown in FIG. 1, the stencil printing apparatus 1 of this embodiment further includes a sheet information detection unit 75, which detects the width and thickness of the printing sheet P1 placed at the paper feeding unit 20. The sheet information detection unit 75 may be formed using an optical sensor, for example. Although the width and thickness of the printing sheet P1 are detected in this embodiment, this is not intended to limit the invention. For example, the width and thickness of the printing sheet P1 may be inputted by the operator as settings.

Figure 3:
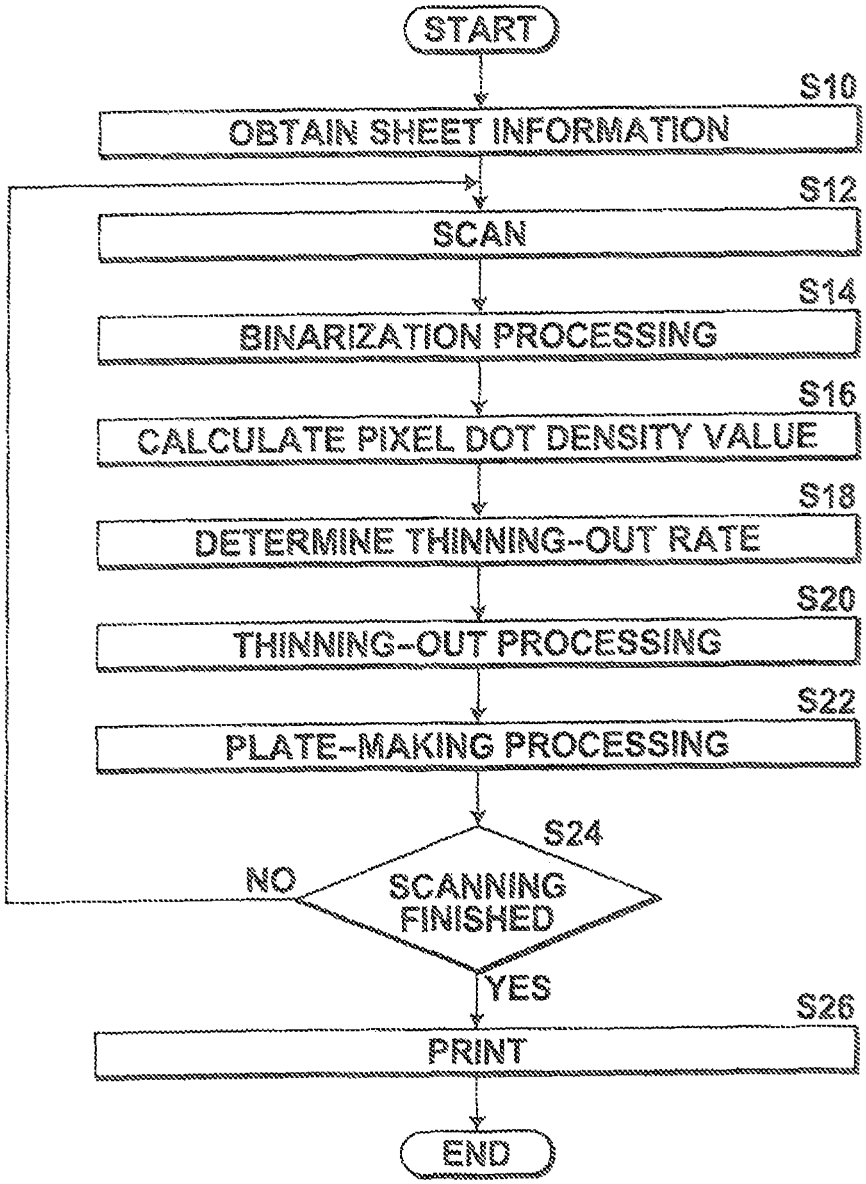
FIG. 3 is a flow chart for explaining operation of the first embodiment of the stencil printing apparatus of the invention.

Next, operation of the stencil printing apparatus 1 of the first embodiment of the invention is described. First, operation of the image data generating unit 60 is described with reference to the flow chart shown in FIG. 3.

First, the printing sheet P1 is placed in the feed tray 21 of the paper feeding unit 20, and the width and thickness of the printing sheet P1 are detected by the sheet information detection unit 75 (S10). It should be noted that the width of the printing sheet P1 refers to the sheet width along the length direction of the first and second pressing rollers 42 and 52. Then, information of the detected width and thickness of the printing sheet P1 is received by the sheet information receiving unit 64 of the image data generating unit 60, and the sheet information receiving unit 64 outputs the information of the width and thickness the printing sheet P1 to the pressing pressure obtaining unit 65.

The pressing pressure obtaining unit 65 has preset pressing pressure values corresponding to various widths and thicknesses of the printing sheets P1. Specifically, as shown in FIG. 4, the preset pressing pressure values are determined such that a higher pressing pressure is provided for a larger width of the printing sheet P1 and a higher pressing pressure is provided for a smaller thickness of the printing sheet P1.

The pressing pressure obtaining unit 65 obtains one of the preset pressing pressure values, which has a magnitude determined in the manner as described above, based on the information of the width and thickness of the printing sheet P1 inputted thereto.

Subsequently, the original document is placed on a platen of the image reading unit 10, and is scanned by the line image sensor to read the image data with the original document being pressed by the pressing plate (S12). Then, multivalued image data which represents the image recorded on the original document is sequentially obtained for each line by the image reading unit 10, and the multivalued image data is fed from the image reading unit 10 to be received by the image data receiving unit 61 of the image data generating unit 60.

The image data receiving unit 61 outputs the received multivalued image data to the binarization processing unit 62. The binarization processing unit 62 applies the binarization processing to the inputted multivalued image data for each line to convert the multivalued image data into binary image data (S14). The binarization processing may be achieved using any of known binarization methods, such as simple binarization, error diffusion and halftone binarization.

Then, the binary image data obtained through the conversion at the binarization processing unit 62 is outputted to the pixel dot density obtaining unit 63 and the thinning-out processing unit 67.

The pixel dot density obtaining unit 63 obtains a pixel dot density value as image density information of the inputted binary image data based on the binary image data (S16). Specifically, as shown in FIG. 5, a partial area of the entire binary image data is set as a reference area, and the number of black pixels in the reference area is counted. Then, a ratio of the number of black pixels to the total number of pixels in the reference area is obtained as a pixel dot density value. Then, the obtained pixel dot density value is assigned to a pixel of interest, which is the pixel at the center of the reference area. It should be noted that FIG. 5 shows a range of the reference area and the position of the pixel of interest in a case where an area of 5×5 pixels is set as the reference area. As shown in FIG. 5, if 20 pixels among 25 pixels, which is the total number of pixels in the reference area, are black pixels, the pixel dot density value is: 20 pixels/25 pixels=0.8.

Then, the reference area is shifted by one pixel in the X-direction in FIG. 5, and the pixel dot density value in the next reference area is obtained and is assigned to the next pixel of interest. By repeating this operation, the pixel dot density values are assigned to all the pixels of each line of the binary image data.

It should be noted that, if a larger reference area is set, a longer time is taken for counting the number of black pixels, and this slows down the processing speed. Therefore, in this case, each time the reference area is shifted by one pixel, only increase and decrease of the number of black pixels in difference areas between the previous reference area and the current reference area may be counted to calculate the number of black pixels.

As a memory for storing the binary image data, a line buffer memory (see FIG. 5), which stores lines of data corresponding to the reference area necessary for calculating the pixel dot density value as described above, may be used. With this, memory capacity can be minimized, thereby achieving cost reduction.

Then, information of the pixel dot density value assigned to each pixel at the pixel dot density obtaining unit 63 and information of the pressing pressure value obtained at the pressing pressure obtaining unit 65 are outputted to the image density information conversion unit 66.

Then, the image density information conversion unit 66 obtains a thinning-out rate for each pixel based on the information of the pixel dot density value of each pixel and the information of the pressing pressure value inputted thereto (S18). Specifically, the image density information conversion unit 66 has image density conversion curves set for different pressing pressures, as shown in FIG. 6, which associate the pixel dot density value with the thinning-out rate.

As shown in FIG. 6, the image density conversion curves for different pressing pressures are set such that a higher thinning-out rate is provided for a certain pixel dot density value under a higher pressing pressure. Further, each image density conversion curve provides a higher thinning-out rate for a higher pixel dot density value assigned to each pixel. Further, each image density conversion curve has the following characteristics: the increase ratio (slope) of the thinning-out rate relative to increase of the pixel dot density gradually increases along with increase of the pixel dot density, and then, the increase ratio (slope) of the thinning-out rate gradually decreases. It is desirable that the increase ratio (slope) is constant or gently increased to the pixel dot density value of 0.5, where the amount of ink transfer increases, steeply increased from the pixel dot density value of 0.5, and then, gently increased again. It should be noted that the characteristics of the image density conversion curves may automatically be changed depending on environmental conditions, such as ambient temperature, or changed by an operator according to taste.

Now, the reason for providing the characteristics of the thinning-out rate for the pixel dot density as shown in FIG. 6 is explained.

First of all, in this embodiment, the thinning-out rate which corresponds to the pixel dot density value of each reference area is assigned to the pixel of interest in the reference area, as described above. This is different from assigning the thinning-out rate to each black pixel in the reference area.

If the thinning-out rate were to be assigned to each black pixel in the reference area, for example, it is necessary to count the number of black pixels in the reference area after the thinning out processing and to identify the black pixels. This increases the implementation cost. Further, in a case where the reference area is shifted from left to right and from top to bottom, the lower-right half of the reference area has not yet been subjected to the thinning-out processing, and it is necessary to estimate the result of the thinning out processing. This requires preparing an estimation algorithm.

In contrast, the method of this embodiment can be implemented with a simple configuration.

However, in the case where the method of this embodiment is applied, even a white pixel may be a pixel of interest for the thinning out processing depending on the image density of the surrounding area.

Therefore, it is necessary to calculate with a slightly increased thinning-out rate compared to the case where only black pixels are thinned out.

Thus, the thinning-out rate is steeply increased from the pixel dot density value of 0.5, which corresponds to a medium image density, and the thinning-out rate is gently increased without topping up the thinning-out rate for the pixel dot density in a high image density area since the possibility of a white pixel being the pixel of interest for the thinning out processing is low in such an area.

For the pixel dot density in a low image density area, it is not necessary to apply the thinning-out processing because no ink retransfer occurs. However, considering the continuity of image density after the thinning-out processing, a small thinning-out rate is assigned.

Then, the image density information conversion unit 66 selects one of the image density conversion curves based on the information of the pressing pressure value inputted thereto, and calculates the thinning-out rate for each pixel based on the image density conversion curve and the pixel dot density value of each pixel. For example, if the inputted pressing pressure value indicates the low pressing pressure shown in FIG. 6, the lowermost image density conversion curve shown in FIG. 6 is selected. If the pixel of interest for which the thinning-out rate is calculated is the pixel of interest shown in FIG. 5, the pixel dot density value thereof is 0.8, and thus a value "0.35" is obtained as the thinning-out rate. In this manner, the thinning-out rates are assigned to all the pixels.

The thinning-out rate assigned to each pixel at the image density information conversion unit 66 is outputted to the thinning-out processing unit 67.

The thinning-out processing unit 67 applies the thinning-out processing to the binary image data based on the binary image data inputted thereto and the thinning-out rate assigned to each pixel (S20). Specifically, in a case where the thinning-out processing is carried out stochastically based on random numbers, for example, a black pixel may be converted into a white pixel if a value determined from random numbers from 0 to 1 is smaller than the thinning-out rate assigned to each pixel. For example, the pixel of interest shown in FIG. 5 has the pixel dot density of 0.8, and the thinning-out rate of 0.35 has been determined using the image density conversion curve shown in FIG. 6. Thus, this pixel of interest has a 35% probability of being converted into a white pixel.

Figures 7, 8:
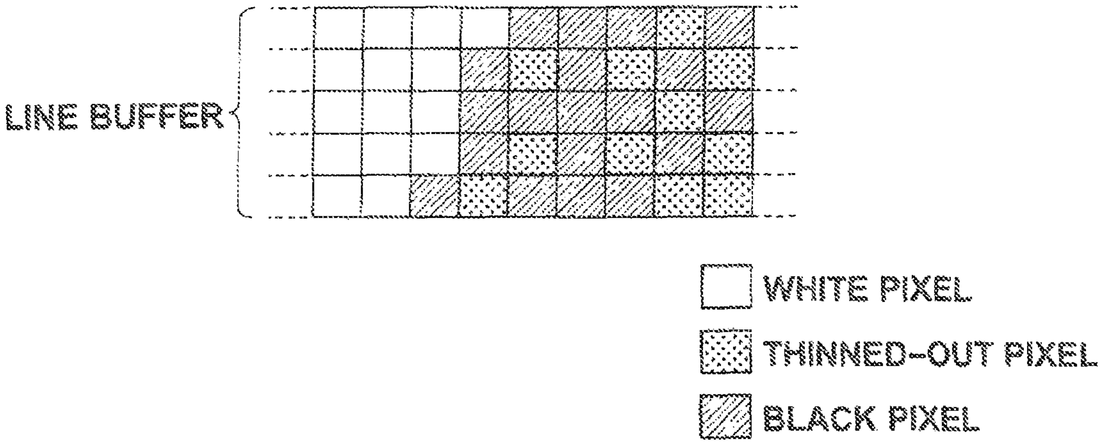
FIG. 7 is a diagram illustrating one example of a threshold matrix.
FIG. 8 is a diagram illustrating one example of processed image data subjected to thinning-out processing.

Besides the method using random numbers as described above, a probability table, such as a threshold matrix as shown in FIG. 7, may be provided, and a black pixel may be converted into a white pixel when a value in the threshold matrix corresponding to coordinates of each pixel is smaller than the thinning-out rate assigned to the pixel of interest.

A value T(X,Y) in the threshold matrix corresponding to each pixel may be obtained using the following method. With the threshold matrix shown in FIG. 7, for example, X coordinates of 0 to 3 are assigned from left to right and Y coordinates of 0 to 3 are assigned from bottom to top. Then, coordinates of a value in the threshold matrix assigned to a certain pixel (x,y) are: X=x % 4, Y=y % 4, where the symbol "%" is an operator that returns a remainder of x or y divided by 4.

FIG. 8 shows one example of the processed image data, which is obtained by applying the above-described thinning-out processing to the binary image data shown in FIG. 5. As shown in FIG. 8, more pixels are thinned out from the area on the right having a higher pixel dot density, which is away from the edge. If the pressing pressure value, which is determined from the information of the width and thickness of the printing sheet P1, is higher, even more pixels are thinned out on the whole.

Then, the processed image data for each line generated at the thinning-out processing unit 67 is sequentially outputted to the first plate making unit 30, where the stencil master sheet M is perforated using the thermal head 31 of the first plate making unit 30 based on the processed image data for each line to sequentially achieve the plate making processing for each line (S22).

If scanning has not yet been finished for all the lines, the reference area is shifted by one pixel in the Y-direction shown in FIG. 5, and the process returns to S12 and the operations in S12 to S22 are repeated (S24).

The above-described operations in S12 to S22 are carried out for each image of the original documents to be double-face printed. The processed image data corresponding to one of the images is inputted to the first plate making unit 30, as described above, where the plate making processing is carried out. The processed image data corresponding to the other of the images is inputted to the second plate making unit 35, where the plate making processing is carried out. It should be noted that, with respect to the operations corresponding to the image to be printed at the second printing unit 50, only the scanning (S10), the binarization processing (S12) and the plate making processing (S20) may be carried out since no contamination due to the ink retransfer occurs.

Then, the master sheet which has been subjected to the plate making processing at the first plate making unit 30 is wrapped around the first printer drum 41, and the master sheet which has been subjected to the plate making processing at the second plate making unit 35 is wrapped around the second printer drum 51, and the printing operation is carried out (S26).

Specifically, an ink feed pump (not shown) feeds the ink to the interior of the first printer drum 41 and the interior of the second printer drum 51, and the first and second printer drums 41 and 51 are driven to rotate. Then, synchronously with the rotation of the first and second printer drums 41 and 51, the printing sheet P1 is fed from the feed tray 21 by the primary feed rollers 22 at predetermined timing, and the printing sheet P1 once abuts on the secondary feed rollers 23 and forms slack. Then, the printing sheet P1 is conveyed by the secondary feed rollers 23 from left to right in FIG. 1 at predetermined timing to be fed between the first printer drum 41 and the first pressing roller 42. Then, the printing sheet P1 is pressed by the first pressing roller 42 against the stencil master sheet M, which has been subjected to plate making and wrapped around the outer circumferential surface of the first printer drum 41, to achieve single-face stencil printing on the printing sheet P1. It should be noted that the pressing pressure of the first pressing roller 42 at this time is set to the pressing pressure obtained by the pressing pressure obtaining unit 65.

When the first printer drum 41 has rotated by a predetermined angle and the single-face stencil printing on the printing sheet P1 has been finished, the single-face printed printing sheet P2 is peeled off by the peeling nail 43 from the first printer drum 41. The peeled single-face printed printing sheet P2 is conveyed by the curved conveyance unit 44 to the intermediate stocking unit 46.

The single-face printed printing sheet P2 is once stocked at the intermediate stocking unit 46, then, discharged from the intermediate stocking unit 46 with the printed surface facing down (the unprinted surface facing up) and picked up by the pickup rollers 47 to once abut on the timing rollers 48 to form slack. Then, the printing sheet P2 is fed by the timing rollers 48 between the second printer drum 51 and the second pressing roller 52 at predetermined timing.

Then, the unprinted surface of the single-face printed printing sheet P2 is pressed by the second pressing roller 52 against the stencil master sheet M, which has been subjected to plate making and wrapped around the outer circumferential surface of the second printer drum 51, to achieve stencil printing on the unprinted surface of the single-face printed printing sheet P2. It should be noted that the pressing pressure of the second pressing roller 52 at this time is set to the pressing pressure obtained by the pressing pressure obtaining unit 65.

When the second printer drum 51 has rotated by a predetermined angle and the stencil printing on the unprinted surface of the single-face printed printing sheet P2 has been finished, the double-face printed printing sheet P3 is peeled off by the peeling nail 53 from the second printer drum 51, and the peeled double-face printed printing sheet P3 is conveyed by the discharging belt unit 72 to the discharge tray 71 to be stacked at the discharge tray 71.

Then, the next printing sheet P1 is fed from the feed tray 21, and double-face stencil printing is carried out on the printing sheet P1 in the same manner as described above.

Next, a second embodiment of the stencil printing apparatus employing the image data generation device of the invention is described in detail. The difference of the stencil printing apparatus of the second embodiment from the above-described stencil printing apparatus 1 of the first embodiment lies in the configuration of the image data generating unit. Other units are the same as those in the stencil printing apparatus of the first embodiment 1, and therefore only the configuration and operation of the image data generating unit are described below.

In the stencil printing apparatus 1 of the first embodiment, the pixel dot density value in the reference area is calculated based on the binary image data, and the thinning-out processing is carried out at the thinning-out rate according to the pixel dot density value. With this processing, however, image quality may be degraded due to interference between the pattern of the binary image data and the pattern of the thinning-out. Such interference appears in a photographic picture area represented by multiple tone image data, etc.

Therefore, the image data generating unit of the stencil printing apparatus of the second embodiment carries out image density conversion processing at the photographic picture area, where tone is important, based on the multivalued image data.

Figure 9:
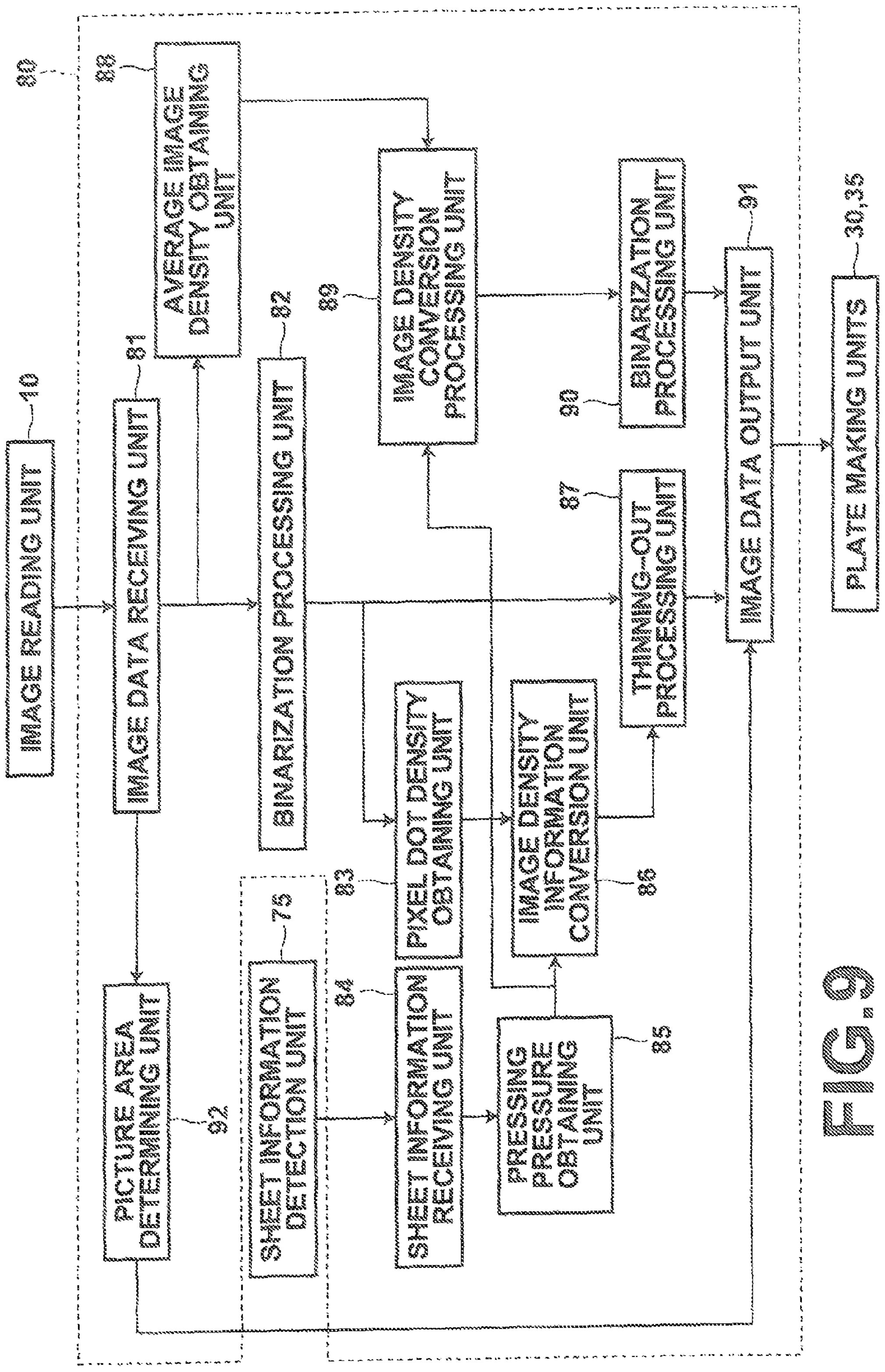
FIG. 9 is a block diagram illustrating the configuration of an image data generating unit according to a second embodiment of the stencil printing apparatus of the invention.

Specifically, as shown in FIG. 9, the image data generating unit 80 of the stencil printing apparatus of the second embodiment includes: an image data receiving unit 81, which receives an input of the image data outputted from the image reading unit 10; an average image density obtaining unit 88, which obtains an average image density value in the reference area, which is a part of the image data received by the image data receiving unit 81; an image density conversion processing unit 89, which obtains output image density of the multivalued image data in the reference area based on the pressing pressure value obtained by a pressing pressure obtaining unit 85 and the average image density value obtained by the average image density obtaining unit 88; and a binarization processing unit 90, which applies binarization processing to converted multivalued image data, which has been subjected to image density conversion by the image density conversion processing unit 89.

The image data generating unit 80 further includes: a picture area determining unit 92, which obtains information of a photographic picture area in the image data by determining whether or not the image data represents a photographic picture based on the image data received by the image data receiving unit 81; and an image data output unit 91, which selects one of the processed image data outputted from a thinning-out processing unit 87 and the processed image data outputted from the binarization processing unit 90 based on the information of the photographic picture area outputted from the picture area determining unit 92, and outputs the selected processed image data to the first and second plate making units 30 and 35.

A binarization processing unit 82, a pixel dot density obtaining unit 83, a sheet information receiving unit 84, the pressing pressure obtaining unit 85, an image density information conversion unit 86 and the thinning-out processing unit 87 are the same as the corresponding units of the above-described stencil printing apparatus of the first embodiment.

Next, operation of the image data generating unit 80 of the stencil printing apparatus of the second embodiment of the invention is described with reference to the flow chart shown in FIG. 10.

First, the width and thickness of the printing sheet P1 are detected by the sheet information detection unit 75 (S30). Then, information of the detected width and thickness of the printing sheet P1 is received by the sheet information receiving unit 84 of the image data generating unit 80, and the sheet information receiving unit 84 outputs the information of the width and thickness of the printing sheet P1 to the pressing pressure obtaining unit 85.

The pressing pressure obtaining unit 85 obtains the pressing pressure value, in the same manner as in the first embodiment, based on the information of the width and thickness of the printing sheet P1 inputted thereto.

Subsequently, the original document is placed on the platen of the image reading unit 10, and is scanned by the line image sensor to read the image data with the original document being pressed by the pressing plate (S32). Then, the multivalued image data which represents the image recorded on the original document is sequentially obtained for each line by the image reading unit 10, and the multivalued image data is fed from the image reading unit 10 to be received by image data receiving unit 81 of the image data generating unit 80.

The image data receiving unit 81 outputs the received multivalued image data to the picture area determining unit 92, the binarization processing unit 82 and the average image density obtaining unit 88.

The picture area determining unit 92 determines an area of the multivalued image data representing a photographic picture, based on the multivalued image data inputted thereto (S34). The photographic picture area can be determined using any of known determining methods, and may be determined, for example, using an image feature of the multivalued image data, such as likelihood of being an edge or density distribution. Then, the picture area determining unit 92 outputs the information of the photographic picture area to the image data output unit 91.

Then, the average image density obtaining unit 88 obtains an average image density value as the image density information based on the multivalued image data inputted thereto (S36). Specifically, a partial area of the entire multivalued image data is set as a reference area, similarly to the first embodiment, and an average value of image density values of all the pixels in the reference area is calculated as the average image density value. Then, the obtained average image density value is assigned to a pixel of interest, which is the pixel at the center of the reference area.

Then, the reference area is shifted by one pixel in the X-direction, and the average image density value of the next reference area is obtained and is assigned to the next pixel of interest. By repeating this operation, the average image density values are assigned to all the pixels of each line of the multivalued image data.

It should be noted that, if a larger reference area is set, a longer time is taken for calculating the average image density value, and this slows down the processing speed. Therefore, in this case, each time the reference area is shifted by one pixel, only increase and decrease of the image density values in difference areas between the previous reference area and the current reference area may be calculated to calculate the average image density value.

Then, the average image density value assigned to each pixel at the image density conversion processing unit 89 and the information of the pressing pressure value obtained at the pressing pressure obtaining unit 85 are outputted to the image density conversion processing unit 89.

Then, the image density conversion processing unit 89 obtains an output image density value for each pixel based on the information of the average image density value for each pixel and the information of the pressing pressure value inputted thereto (S38). Specifically, the image density conversion processing unit 89 has image density conversion curves set for different pressing pressures, as shown in FIG. 11, which associate the average image density value with the output image density value.

Figure 11:
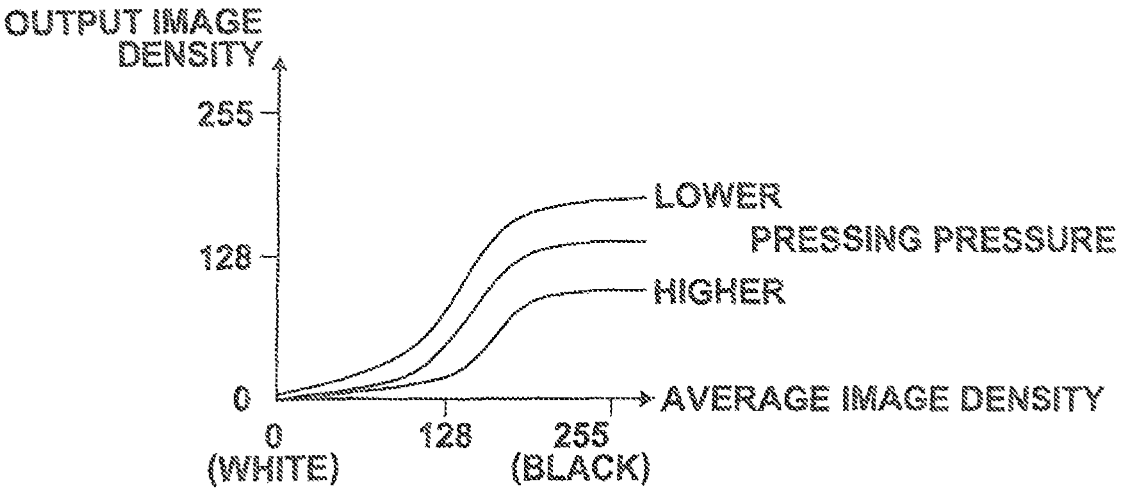
FIG. 11 is a diagram illustrating one example of image density conversion curves for different pressing pressures.

As shown in FIG. 11, the image density conversion curves for different pressing pressures are set such that a lower output image density value is provided for a certain average image density value under a higher pressing pressure. Further, each image density conversion curve is set such that the range of the output image density values is narrower than the range of the average image density values, and the output image density value corresponding to a certain average image density value is smaller than the average image density value. Further, each image density conversion curve has the following characteristics: the increase ratio (slope) of the output image density value relative to increase of the average image density value gradually increases along with increase of the average image density value, and then, the increase ratio (slope) of the output image density value gradually decreases. It is desirable that the increase ratio (slope) is constant or gently increased to the average image density value of 128, where the amount of ink transfer increases, steeply increased from the average image density value of 128, and then, is constant or gently increased again. It should be noted that the characteristics of the image density conversion curves may automatically be changed depending on environmental conditions, such as ambient temperature, or changed by an operator according to taste.

Then, the image density conversion processing unit 89 selects one of the image density conversion curves based on the information of the pressing pressure value inputted thereto, and calculates the output image density value for each pixel based on the image density conversion curve and the average image density value of each pixel.

Then, the output image density value assigned to each pixel at the image density conversion processing unit 89 is outputted to the binarization processing unit 90.

The binarization processing unit 90 applies the binarization processing to the output image density values inputted thereto to generate the binary image data, and outputs the binary image data as the processed image data to the image data output unit 91 (S42). It should be noted that the binarization processing may be achieved using any of known binarization methods, such as simple binarization, error diffusion and halftone binarization.

Figure 10:
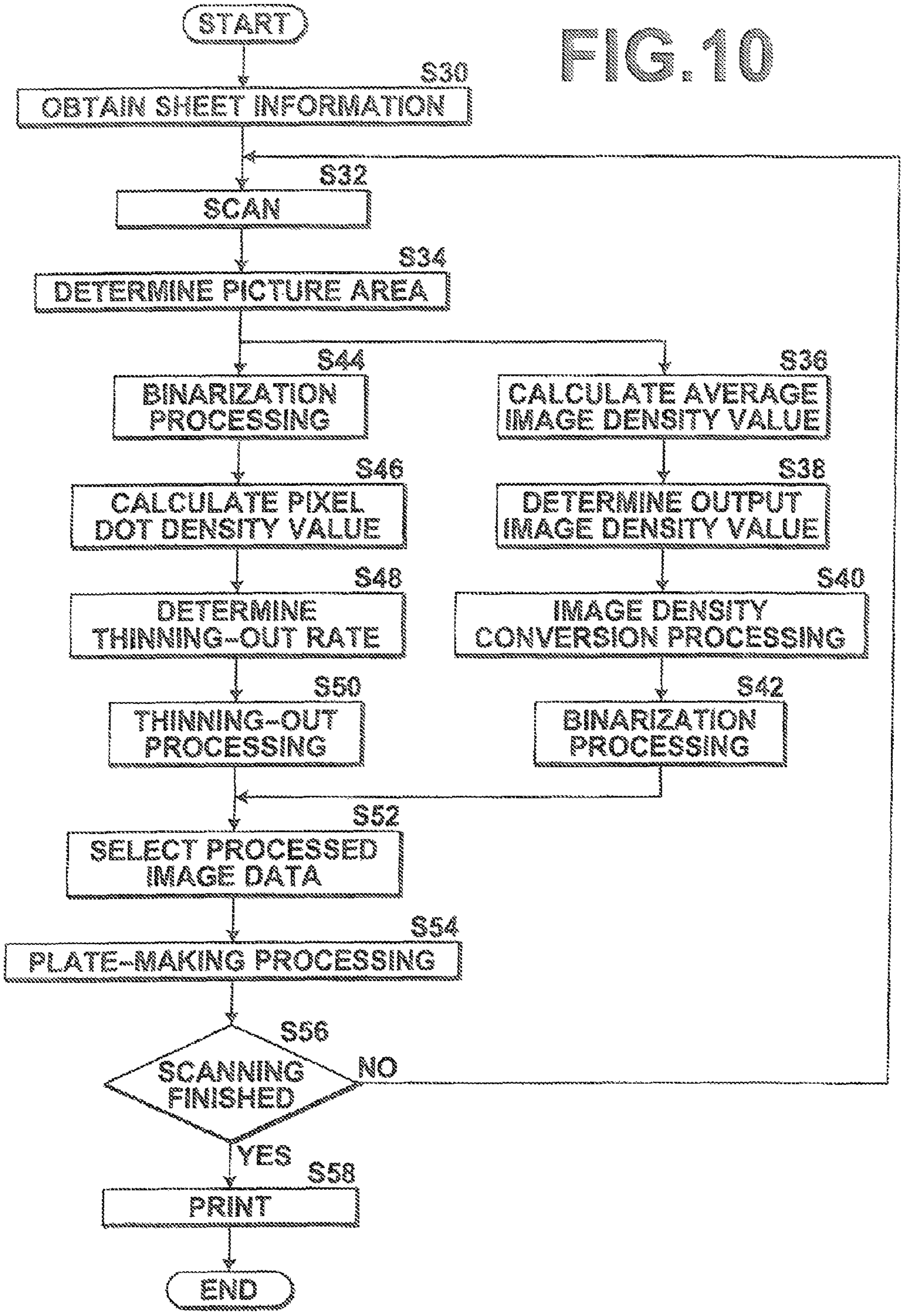
FIG. 10 is a flow chart for explaining operation of the second embodiment of the stencil printing apparatus of the invention.

Operations in S44 to S50 shown in FIG. 10 are carried out in parallel with the operations in S36 to S42 described above. The operations in S44 to S50 are the same as the operations in S14 to S20 shown in FIG. 3 of the stencil printing apparatus of the first embodiment. Then, the processed image data, which has been subjected to the thinning-out processing at the thinning-out processing unit 87, is outputted to the image data output unit 91.

Then, based on the information of the photographic picture area outputted from the picture area determining unit 92, the image data output unit 91 selects the processed image data outputted from the binarization processing unit 90 for the photographic picture area or selects the processed image data outputted from the thinning-out processing unit 87 for areas other than the photographic picture area, and outputs the selected processed image data to the first plate making unit 30.

Subsequently, the stencil master sheet M is perforated using the thermal head 31 of the first plate making unit 30 to achieve the plate making processing (S54).

If scanning has not yet been finished for all the lines, the reference area is shifted by one pixel in the Y-direction shown in FIG. 5, and the process returns to S32 and the operations in S32 to S54 are repeated (S56).

The above-described operations in S32 to S54 are carried out for each image of the original documents to be double-face printed. The processed image data corresponding to one of the images is inputted to the first plate making unit 30, as described above, where the plate making processing is carried out. The processed image data corresponding to the other of the images is inputted to the second plate making unit 35, where the plate making processing is carried out.

Then, the master sheet which has been subjected to the plate making processing at the first plate making unit 30 is wrapped around the first printer drum 41, and the master sheet which has been subjected to the plate making processing at the second plate making unit 35 is wrapped around the second printer drum 51, and the printing operation is carried out (S58). The printing operation is the same as that described for the stencil printing apparatus 1 of the first embodiment.

In the above-described first and second embodiments, although the entire image data is scanned with the reference area and the thinning-out processing is carried out based on the pixel dot density in each reference area, it is not necessary to scan the entire image data with the reference area, and only a partial area of the image data may be scanned with the reference area.

Specifically, in the image area of the image data, only an area where the pixel values are not less than a threshold value may be scanned with the reference area.

Further, although the size of the reference area is 5×5 pixels in the above-described first and second embodiments, this is not intended to limit the invention. The reference area may have any other size.

Although the image data generating unit is provided in the stencil printing apparatus in the above-described first and second embodiment, this is not intended to limit the invention. The image data generating unit may be provided, for example, in a printer controller, which outputs control signals, such as a printer job, to the stencil printing apparatus.

Although the stencil printing apparatuses of the first and second embodiments receive the image data outputted from the image reading unit 10, this is not intended to limit the invention. The stencil printing apparatus of the invention may receive image data which has been edited or generated on a computer, such as a personal computer. Alternatively, the image data generating unit may be implemented on a computer.

Further, although the pressing pressure value is obtained according to the width and thickness of the printing sheet in the stencil printing apparatuses of the first and second embodiments, the pressing pressure value may be obtained according to the width or the thickness of the printing sheet.

What is claimed is:

1. A method for generating image data, comprising the steps of:

receiving an input of image data, and receiving information of width and/or thickness of a recording medium, the recording medium receiving an image representing the image data to be recorded thereon;

obtaining a preset pressing pressure value based on the information of width and/or thickness, the preset pressing pressure value being used when the image is recorded on the recording medium;

obtaining information of image density in a reference area, the reference area being a part of the image data;

obtaining converted image density information by converting the information of image density in the reference area based on the pressing pressure value and the information of image density; and generating image data according to the obtained converted image density information.

2. A device for generating image data, comprising:

an image data receiving unit for receiving an input of image data;

a recording medium information receiving unit for receiving information of width and/or thickness of a recording medium, the recording medium receiving an image to be recorded thereon, the image representing the image data received by the image data receiving unit;

a pressing pressure obtaining unit for obtaining a preset pressing pressure value based on the information of width and/or thickness received by the recording medium information receiving unit, the preset pressing pressure value being used when the image is recorded on the recording medium;

an image density information obtaining unit for obtaining information of image density in a reference area, the reference area being a part of the image data;

an image density information conversion unit for obtaining converted image density information by converting the information of image density in the reference area based on the pressing pressure value and the information of image density; and an image data obtaining unit for generating processed image data according to the converted image density information obtained by the image density information conversion unit.

3. The device for generating image data as claimed in claim 2, wherein the image density information obtaining unit obtains information of pixel dot density in the reference area as the information of image density in the reference area.

4. The device for generating image data as claimed in claim 2, wherein the image density information conversion unit obtains, as the converted image density information, a thinning-out rate for the reference area by converting the information of image density in the reference area, and the image data obtaining unit generates the processed image data by applying thinning-out processing to the image data based on the thinning-out rate obtained by the image density information conversion unit.

5. The device for generating image data as claimed in claim 2, wherein the image density information conversion unit comprises preset image density conversion curves for different pressing pressures, and converts the information of image density by selecting one of the image density conversion curves according to the pressing pressure value inputted thereto.

6. The device for generating image data as claimed in claim 5, wherein the image density conversion curve provides a lower image density information value for a higher value of the information of image density in the reference area, and a ratio of decrease of a value of the converted image density information relative to increase of the value of the information of image density in the reference area gradually increases along with increase of the value of the information of image density in the reference area, and then, the ratio of decrease gradually decreases.

7. The device for generating image data as claimed in claim 2, further comprising:

a picture area determining unit for determining whether or not image data in the reference area is image data representing a photographic picture; and a binarization processing unit for applying binarization processing to the image data, wherein if it is determined by the picture area determining unit that the image data in the reference area is image data representing a photographic picture, the image density information obtaining unit obtains, as the information of image density in the reference area, an average image density in the reference area based on the image data in the reference area before subjected to the binarization processing, the image density information conversion unit obtains an output image density for the image data in the reference area based on the average image density in the reference area, and the image data obtaining unit generates the processed image data by applying image density conversion processing to the image data based on the output image density obtained by the image density information conversion unit, or wherein if it is determined by the picture area determining unit that the image data in the reference area is not image data representing a photographic picture, the image density information obtaining unit obtains, as the information of image density in the reference area, a pixel dot density in the reference area based on the binary image data in the reference area subjected to the binarization processing by the binarization processing unit, the image density information conversion unit obtains a thinning-out rate for the image data in the reference area based on the pixel dot density in the reference area, and the image data obtaining unit generates the processed image data by applying thinning-out processing to the image data based on the thinning-out rate obtained by the image density information conversion unit.

8. A stencil printing apparatus comprising:

the device for generating image data as claimed in claim 2;

a plate making unit for carrying out plate making processing based on the processed image data generated by the image data generation device; and a printing unit comprising a drum, a master sheet processed at the plate making unit being wrapped around on the drum, and a pressing roller for pressing the recording medium against the drum with a pressing pressure corresponding to the pressing pressure value used in the device for generating image data.

* * * * *